June 16, 1931.  A. B. MODINE  1,810,721
HEATING APPARATUS
Filed April 25, 1923    8 Sheets-Sheet 1

Inventor:
Arthur B. Modine

June 16, 1931. A. B. MODINE 1,810,721
HEATING APPARATUS
Filed April 25, 1923 8 Sheets-Sheet 3

June 16, 1931.  A. B. MODINE  1,810,721
HEATING APPARATUS
Filed April 25, 1923   8 Sheets-Sheet 4

Witnesses:
W. F. Kilroy
Harry R. L. White

Inventor:
Arthur B. Modine
By Hill & Hill Attys.

June 16, 1931. A. B. MODINE 1,810,721
HEATING APPARATUS
Filed April 25, 1923 8 Sheets-Sheet 5

Witnesses:
W. F. Kilroy
Harry L. White

Inventor:
Arthur B. Modine
By
Attys

June 16, 1931.  A. B. MODINE  1,810,721
HEATING APPARATUS
Filed April 25, 1923   8 Sheets-Sheet 7

Witnesses:
W. F. Kilroy
Harry R. L. White

Inventor:
Arthur B. Modine
By Hill & Hill Attys.

Patented June 16, 1931

1,810,721

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEATING APPARATUS

Application filed April 25, 1923. Serial No. 634,492.

My invention belongs to that general class of devices known as heating apparatus, and relates more particularly to an improved radiator construction or the like for steam, hot water, or other similar systems. The invention has among its objects the production of apparatus of the kind described that is simple, compact, attractive, inexpensive, of light weight, economical and efficient. The invention has particularly as an object the production of such a structure which is comparatively compact and of light weight and inexpensive, but which will have an efficiency equal to or greater than devices of greatly increased weight and size, and which are considerably more expansive. The same also has as an object the production of a device permitting the construction of a new and novel apparatus providing a simple and efficient heating system. Among its further objects are the production of a device which may be efficiently as well as conveniently controlled to maintain a substantially constant temperature, and also provide improved ventilation or circulation. Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawings, wherein like reference characters indicate like or corresponding parts.

Fig. 4ª is a detail of the air intake regulator shown in Fig. 2;

Referring to the drawings, in which several embodiments of my invention are shown, it may be mentioned that the apparatus consists in a heating unit together with means for inducing a flow of air through the unit, which air will be heated and thence discharged for heating purposes. I have found that the heating unit itself may be made compartively compact without losing any of its efficiency, and in making it compact, it is also of comparatively light weight, and may be economically manufactured. The simplest means of inducing a flow of air through the heating unit is to construct the apparatus so that there is provided what may be termed a "stack" in which the air is admitted at the bottom and heated, and thence travels up the stack and is discharged as desired.

The basis of design of any such heating element is to provide a great amount of heating surface exposed to contact with the air, and at the same time provide for the maximum delivery of air through the heating element. With the effort to cause the flow of air to be constant, it becomes my purpose to arrange the heating elements so that of its "projected area" as great a portion as is possible is open to the air passage therethrough, which idea is lost track of entirely in the ordinary radiator construction as used in heating plants or systems.

Figure 5:
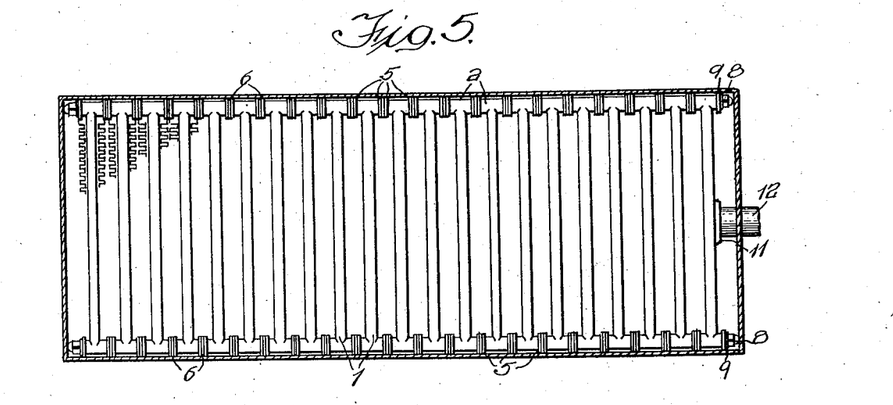
Fig. 5 is a sectional view, slightly enlarged, taken substantially on line 5—5 of Fig. 1.
Figure 6:
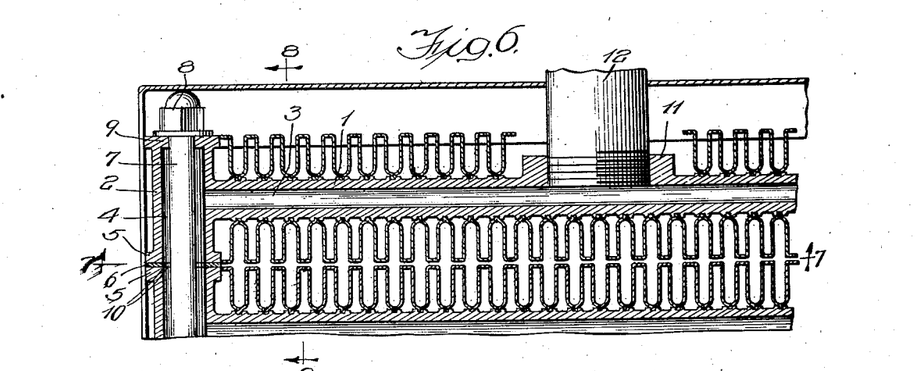
Fig. 6 is an enlarged view illustrating a portion of the same in section.
Figure 7:
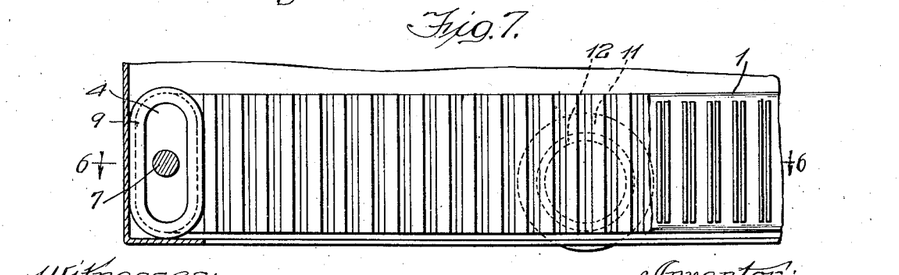
Fig. 7 is a sectional view taken substantially on line 7—7 of Fig. 6.
Figure 8:
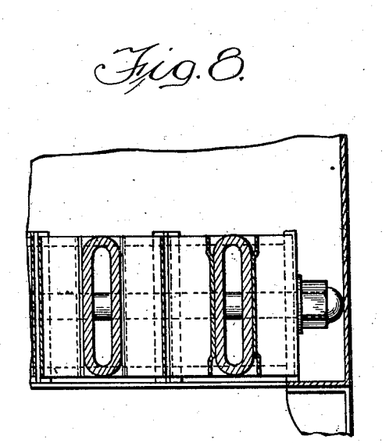
Fig. 8 is an enlarged sectional view taken substantially on line 8—8 of Fig. 6.

Referring particularly to Figs. 5 and 6, 1 represents a conduit, preferably of cast iron or any equivalent and provided with headers 2, the parts being formed with the chambers or ducts 3 and 4. In practice I assemble the desired number of units or parts 1 so as to provide what may be termed a "branched conduit". These unit conduits are arranged together substantially as shown, the headers being provided wth faced flanges 5 so that they may be fitted together, 6 being washers or gaskets which may be arranged between the sections so as to prevent leakage thereat of steam or water. The several sections may be secured together in any suitable manner, rods 7 being shown for the purpose, which extend through the headers and which are provided with nuts 8 or the equivalents at the ends. As most clearly shown in Fig. 6, the outer flange of the header on the end section is constructed as at 9 to form a bearing for the nut and washer, or such packing or gasket as may be found desirable. Ordinarily, however, the openings at the flanges, as indicated at 10 in Fig. 6, are of a size to permit the free passage of the steam or water in the radiator. For a steam radiator, the end header is flanged, as indicated at 11, for the reception of the feed pipe 12. In a one-pipe system, the section at the opposite end of the radiator may be, if desired, similarly formed and closed with a plug.

Figures 1, 2:
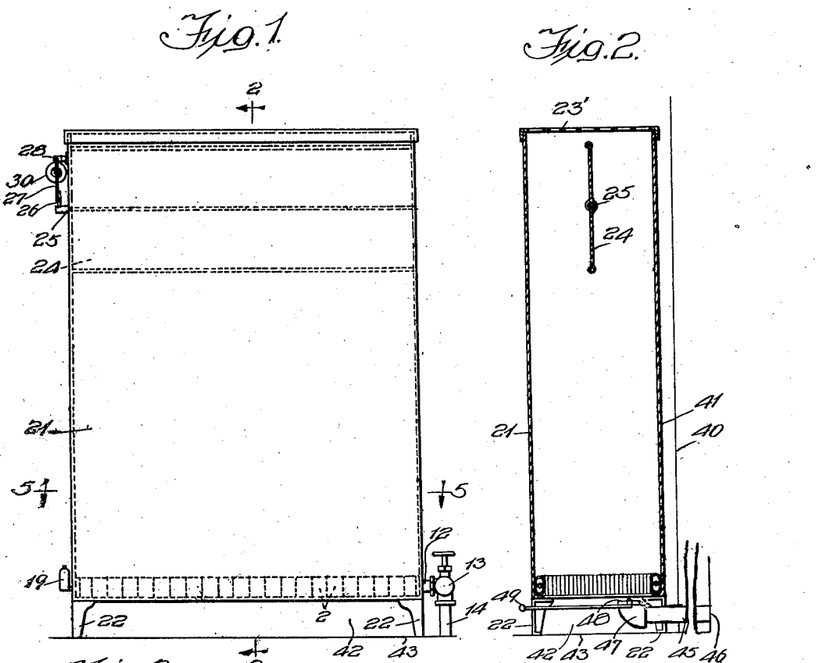
Fig. 1 is a view in elevation of one form of my device.
Fig. 2 is a sectional view taken substantially on line 2—2 of Fig. 1.
Figure 9:
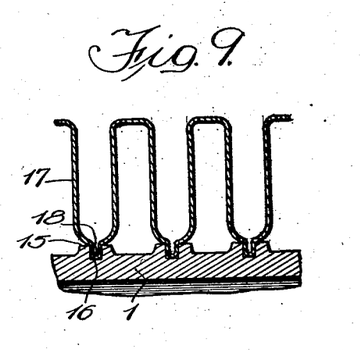
Fig. 9 is a sectional view similar to a portion of Fig. 6, enlarged to more clearly show the construction.

Referring to Fig. 1, 14 represents the feed pipe or supply main, and 13 the usual controlling valve. As most clearly shown in Figs. 6 and 9, the parts 1 of the several associated sections are so constructed that there is a space between the sections for the passage of air, and in these spaces I provide fins of substantially thin sheet metal, copper or any other efficient heat conductor being preferably employed for the purpose. These fins may be of any desired size and shape, and secured in place in any desired manner. In the construction shown, I have arranged them in the form of crimped or corrugated strips, which are suitably secured to the walls of the part 1. In practice I prefer to form the section part 1 with lugs 15, at which are provided slots or recesses 16. The fins 17 are then bent back and forth or crimped, and preferably provided with a portion 18, which may be positioned in the recesses or slots 16. Generally I prefer to solder or braze the fins in place so that a good joint is made, and heat may be readily transmitted therethrough into the fins.

The units are provided with fins on opposite sides, and when the units or sections are assembled together the fins on one section extend adjacent to the other, but preferably with a small space between them forming an air passage. The fins may be of any desired shape or design, it being preferred to provide as much surface as possible. By using the thin sheet metal fins it is obvious that the total area of space between the sections is not reduced to any extent by reason of the fins, and yet the area exposed to the air is very large. This permits a very compact radiator construction. While the height of the sections and fins may be varied, generally I prefer to make them of such height that all the air will be heated and yet there will be no surplus area. If desired, the usual air valve 19 may be provided in the one-pipe system, it being understood that in a vacuum system the vacuum or return pipe may be attached at this point.

In order to induce a circulation of air through the radiator, I provide a shell or casing 21, which in the construction shown is mounted on legs 22, which also carry the radiator, the casing being preferably flanged inwardly at the bottom, as indicated at 23. The casing forms substantially a stack, the height of which will more or less control the draft or velocity of the passing air. The same may be provided with a top 23' having suitable openings therethrough, if desired.

Figure 3:
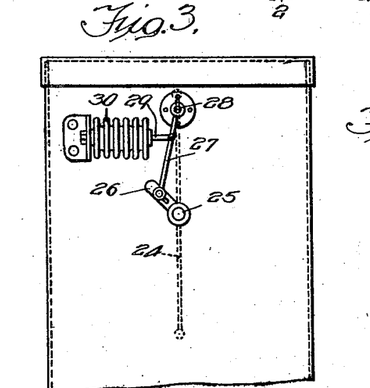
Fig. 3 is a view in elevation of one end of the apparatus, showing mechanism for automatically controlling the operation of the same.
Figures 4, 4A:
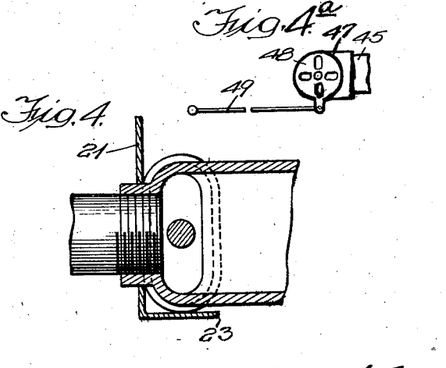
Fig. 4 is a sectional view taken substantially on line 4—4 of Fig. 10.

In the construction shown I have illustrated a damper 24 suitably mounted on a supporting shaft 25, which may extend to the exterior of the casing and be manually or automatically controlled, as desired. By varying the damper position, the amount of air passing through the stack may be made as desired, this depending upon the requirements. I have illustrated in Figs. 1 and 3 a simple device for automatically controlling the damper. Referring particularly to Fig. 3, an arm 26 is mounted on a damper shaft 25, and this is operatively connected through a link 27, which may be supported at 28, and a link 29 with a thermostatic device 30 the particular device shown representing any type of thermostatic apparatus desired. Obviously, as the temperature of the room varies, the thermostatic member will automatically control the damper to open or close the same.

Figure 10:
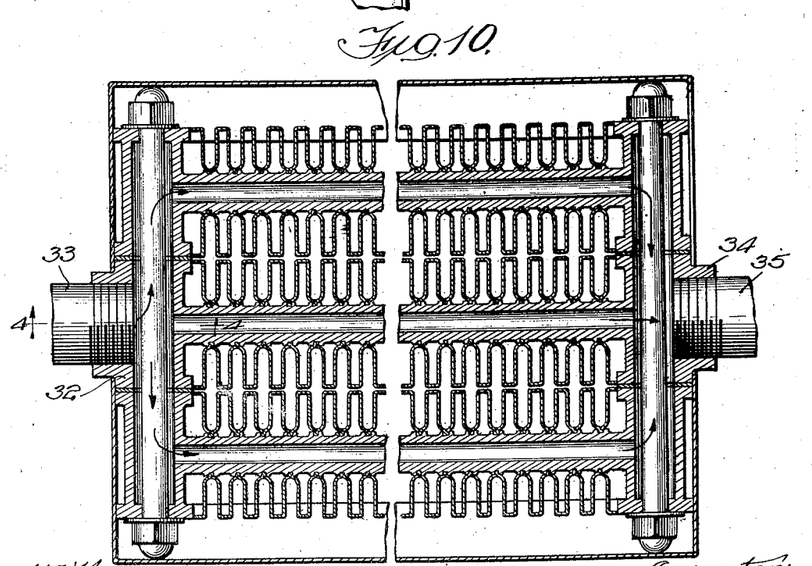
Fig. 10 is a sectional view similar to Fig. 6, showing a modified construction particularly adapted for hot water heat.

In Fig. 10 I have illustrated a somewhat similar construction, except that this type is particularly adapted for hot water heat. The construction is very similar to that described, however,—31 representing sections, and in this case the section is provided with an inlet in the head 32 and an outlet in the head 34 of one of the sections,—33 and 35 representing pipes in the circulating system. In the hot water heating adaption an important object is to attain the required heating without the use of the great bulk of water used in the ordinary system, and which results in very sluggish control of the room temperatures. Another object is to increase the rate of circulation of the hot water. In the hot water system shown the radiator is so constructed that the heated water is circulated at a rate dependent in each channel upon the head in the hot water supply line and is not dependent upon the thermol or hydraulic condition in the channel itself. In other words, the heated water is circulated and gives up its heat, the heat given up being dependent upon the supply of heated water to the radiator core and not dependent upon the thermol or hydraulic condition in each channel or section. This is not at all the case with the usual and well known type of radiator employed for heating purposes.

In Fig. 2 the stack and radiator are shown spaced from the wall 40, as indicated at 41, this, however, varying, as will be hereinafter referred to. As shown in Fig. 2, the device is supported above the floor so that there is a space 42 for the admission of the air which is to be circulated through the stack. In this case I have shown an air pipe 45 extending through the wall 40 from the exterior, for example, of the building, 46 being a guard which may be arranged thereat. The inner end 47 of the pipe is broad adjacent the heater, and a damper 48 may be provided for controlling the admission of outside air, 49 in this case representing a damper-control rod.

Figure 11:
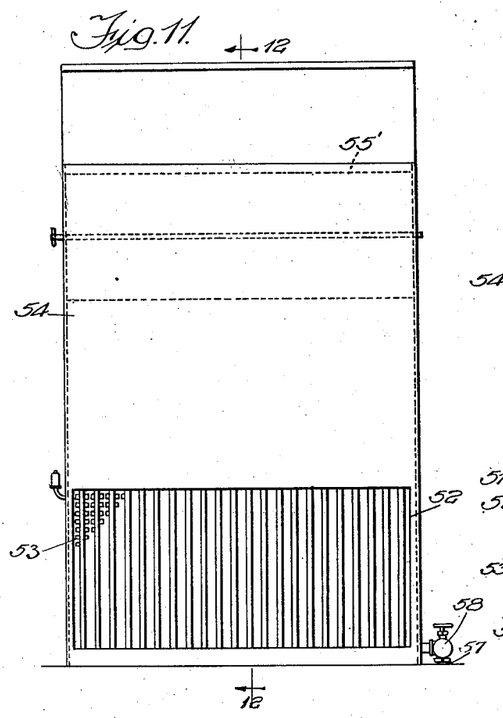
Fig. 11 is a view similar to Fig. 1, illustrating a modified type of device.
Figure 12:
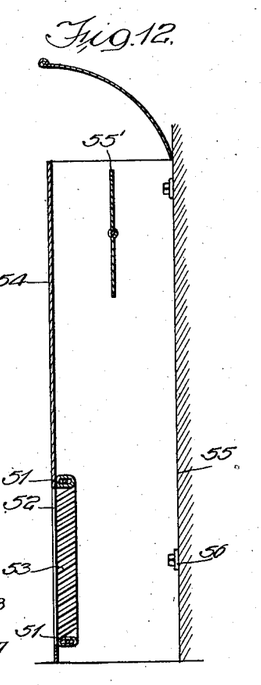
Fig. 12 is a sectional view taken substantially on line 12—12 of Fig. 11.
Figure 13:
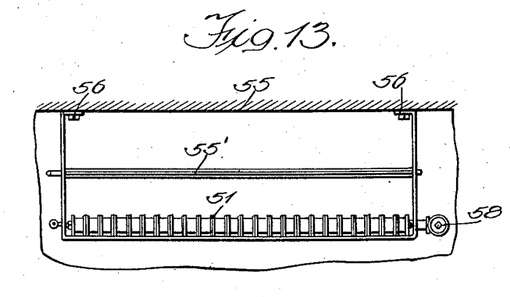
Fig. 13 is a top elevation of the same.

In Figs. 11 to 13 inclusive a slightly modified construction is shown, in which the sections may be assembled substantially as previously described, but in this case the headers 51 are arranged one above the other and connected by the conduits 52, 53 being the fins, which I prefer to extend at an angle. The heating element is disposed at the opening in the casing 54 and is of approximately the same size, leaving a space between it and the rear wall as shown. The fins 53 are inclined to the vertical and horizontal and slope upwardly and inwardly. This device is provided with the stack or casing 54, which may be secured to the wall 55 by the brackets 56, or their equivalents. In this construction it will be noted that the wall itself forms one side of the stack. I have illustrated a damper 55'. The device is connected up with the feed pipe 57, and the usual valve 58 is provided. The air in contact with the tubes and fins is thus caused to flow diagonally upward and into the casing 54. The flow of air out at the top of the casing 54 is controlled by damper 55'. It is believed that the construction will be obvious by reference to the figures specified.

Figure 14:
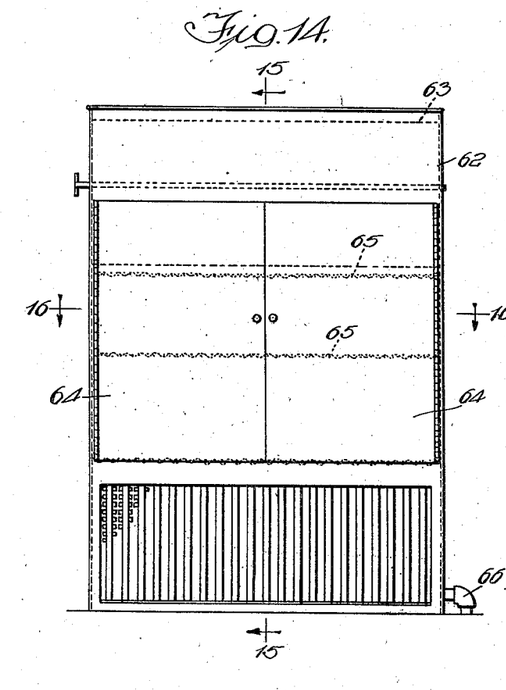
Fig. 14 is a view similar to Fig. 1, illustrating another modified construction.
Figure 15:
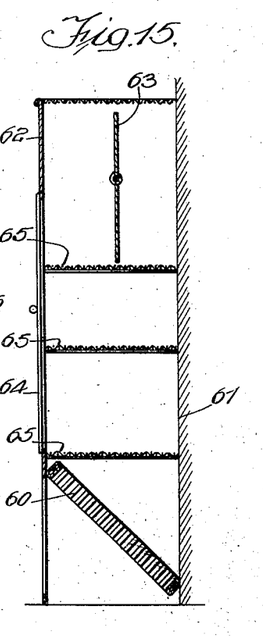
Fig. 15 is a sectional view taken substantially on line 15—15 of Fig. 14.
Figure 16:
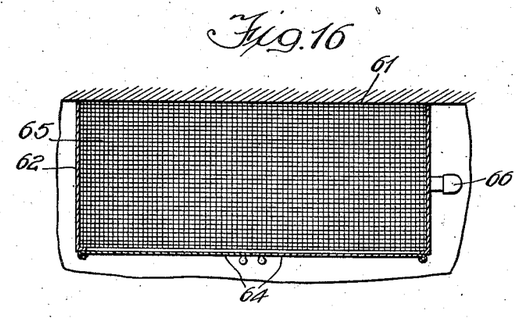
Fig. 16 is a sectional view taken substantially on line 16—16 of Fig. 14.

A somewhat similar arrangement is shown in Figs. 14 to 16, except that in this case the assembled sections are arranged at an angle, as indicated at 60. The wall 61 may form one side, 62 representing the other sides of the stack, and damper 63 may be provided, if preferred. In this particular type the casing or stack is shown provided with doors 64, and with shelves 65, preferably of woven wires or perforated sheets. 66 represents the supply pipe. This form is particularly adapted for use in kitchens, pantries, or any other place in which it may be desired to have a warming closet whereby the heat may be utilized for the additional purpose of warming dishes or other articles.

Figure 17:
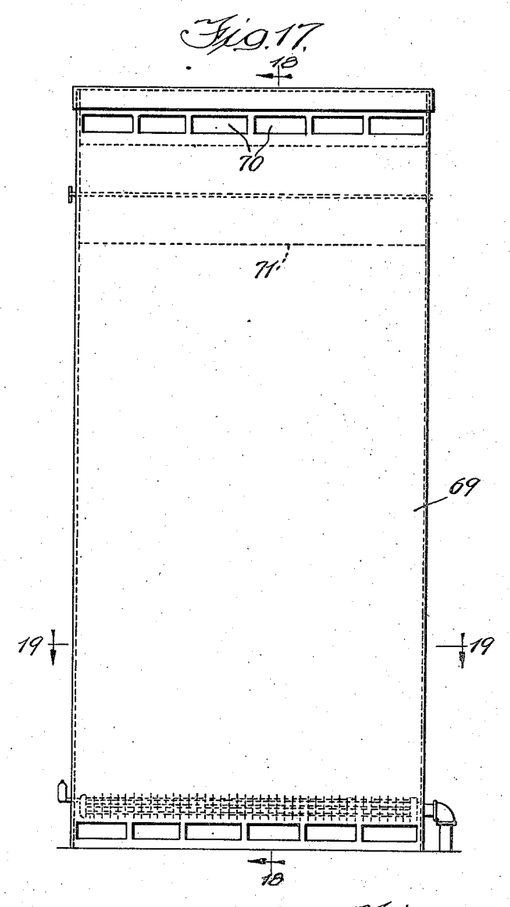
Fig. 17 is a view in elevation similar to Fig. 1, showing another form of the device.
Figure 18:
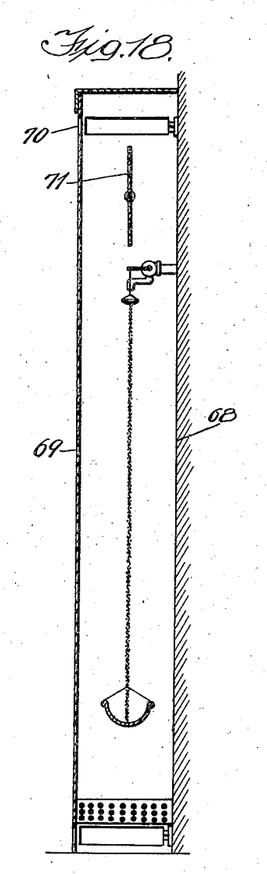
Fig. 18 is substantially a sectional view taken on line 18—18 of Fig. 17.
Figure 19:
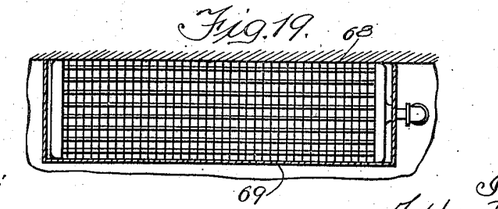
Fig. 19 is a sectional view taken substantially on line 19—19 of Fig. 17.

Figs. 17, 18 and 19 illustrate a mantle type of radiator, a construction in which the stack is of considerable height. The heating sections 67 may be arranged as shown, or in any of the other ways previously described. In this case the casing 69 also has one side made up of the wall 68. There are provided openings 70, through which the heated air may escape, and, if desired, there may be also provided the damper 71.

Figure 20:
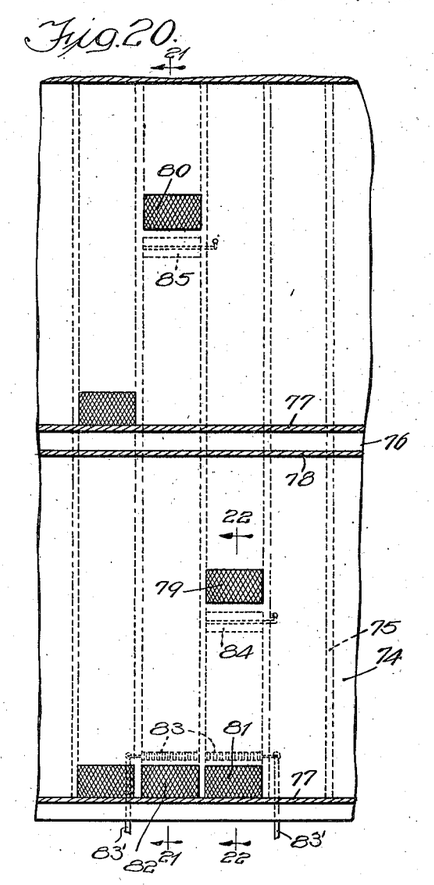
Fig. 20 is a sectional view through a portion of a building showing a modified system and construction installed, embodying the apparatus herein shown.
Figure 21:
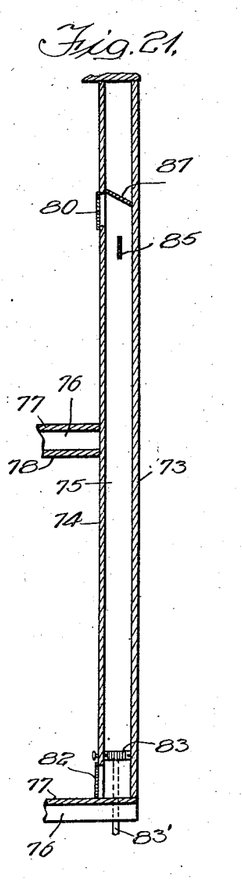
Fig. 21 is a sectional view taken substantially on line 21—21 of Fig. 20.
Figure 22:
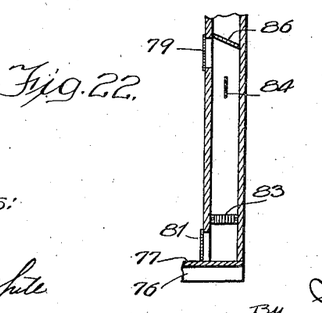
Fig. 22 is a sectional view taken substantially on line 22—22 of Fig. 20.

Figs. 20, 21 and 22 illustrate a built-in construction in which the heating elements are so arranged that the building structure itself forms the stacks, it being understood that the same may be lined or protected in any suitable manner, if desired. There is also shown in these figures how the upper floor may be heated from below, this being particularly desirable in dwellings, in many cases. Referring to the figures last-mentioned 73 represents the outer wall of the buildings, 74 the inner wall, and in the case shown, 75 represents studding or the equivalent. I have also shown the two floors 77, first and second, and the joists 76. 78 represents the ceiling of the first floor.

In this particular construction air is taken from the first floor, heated and discharged to the first and second floors, it being understood that the inlet or taking in of the air to be heated may be at any desired point and supplemented by an air inlet from the exterior of the building. As shown, 79 and 80 represent the two discharge points of the heated air, and 81 and 82 the admission, 83 being heaters substantially similar to those described and made up of the sections of the desired size and shape. These are so mounted in the walls between the studding, or the equivalent, that the building construction itself forms the stack or flue. Dampers 84 and 85 may be provided for regulating the apparatus. The steam feed pipes 83', or water pipes, or other heating-medium conduits, are connected to the heating plant. As will be seen from Figs. 21 and 22, the conduits are preferably closed, as indicated at 86 and 87, so that the heated air is discharged into the room for heating purposes.

The apparatus shown to some extent is similar to the efficient automobile radiator construction, and the design may if desired embody some of the automobile radiator construction features. With the construction described, not only is the apparatus, to wit, the heating units, made up of the several sections and fins of light weight and inexpensive, but the same is also particularly compact and efficient. The stacks may be of the desired size, shape and construction, and made as ornamental as may be desired.

Figure 23:
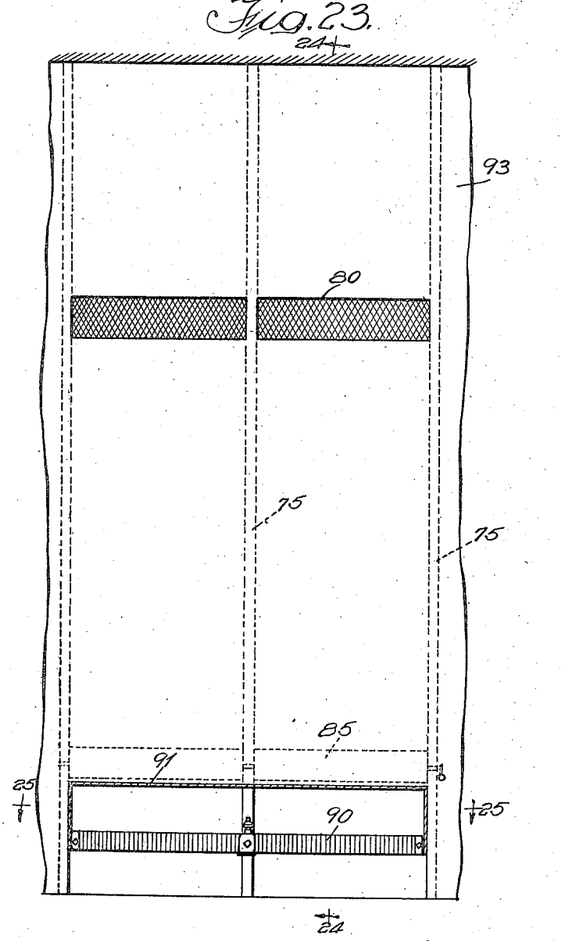
Fig. 23 is a sectional view of another modified form of heating system.
Figure 24:
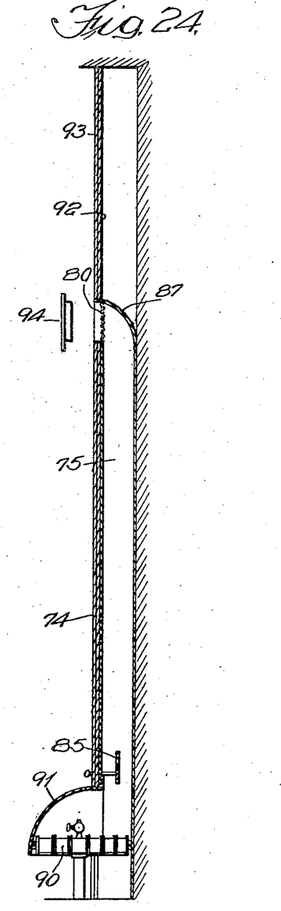
Fig. 24 is a sectional view taken substantially on line 24—24 of Fig. 23.
Figure 25:
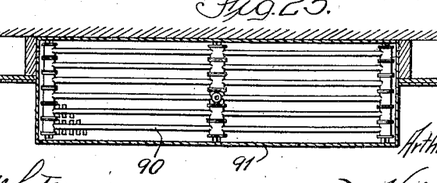
Fig. 25 is a sectional view taken substantially on line 25—25 of Fig. 23.

In the form shown in Figs. 23–25 there is a shield 91 above the heating member 90, the stack being of shallow depth. 92 and 93 indicate the lath and plaster, respectively. 94 indicates a cap which is arranged to close the opening at the discharge end of the duct, if desired.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described, an enclosure, an opening in the upper portion of said enclosure, an opening in the lower portion of said enclosure, a radiator disposed at said lower opening, said radiator comprising a plurality of tubes having tubular end portions disposed at right angles to the tubes, said tubes being provided with transversely arranged spaced recesses and said tubular portions forming passages communicating with the ends of each tube, means extending through said passages for detachably securing the tubes to each other, and a plurality of sets of fins being formed of a single sheet of metal and being provided with spaced projections fitting into said recesses to hold said fins on the tubes, said fins having portions inclined to the vertical and horizontal and sloping upward into said enclosure.

2. In a heating apparatus, an enclosure having an air outlet and having a front wall provided with an opening in the lower portion thereof, and a radiator disposed at said lower opening, perforated shelves arranged above the radiator, said radiator having passage ways providing the only means whereby air may pass through said lower opening into said enclosure.

3. In a heating apparatus, an enclosure having an air outlet and having a front wall provided with an opening in the lower portion thereof, a radiator disposed at said lower opening, perforated shelves arranged above the radiator, said radiator having passage ways providing the only means whereby air may pass through said lower opening into said enclosure, and a damper mounted in the upper portion of said enclosure.

4. In a device of the class described, an enclosure comprising a vertical stack having front and rear walls, said stack having an opening in the upper portion thereof and said front wall having an opening in the lower portion thereof, a radiator obliquely disposed in the lower portion of said stack and having upwardly and rearwardly extending passage ways, said passage ways providing the only means by which air entering said opening can pass through said stack.

5. In a heating apparatus, an enclosure comprising a vertical unrestricted air shaft, an opening in the upper portion of said shaft, an opening in the lower portion of the shaft, a heating element having fluid conducting tubes, all of which are located in substantially the same plane, said heating element being arranged transversely of the length in the interior of the enclosure above said lower opening, said heating element being of substantially the same cross sectional contour as that of the interior of the enclosure and having passage-ways providing the sole means whereby air may pass through said lower opening and into the shaft.

6. In heating apparatus, a member providing an enclosure and an air shaft having an opening in the upper portion thereof, an opening in the lower portion of the member, a heating element, said heating element being arranged transversely of the length in the interior of the enclosure above the lower opening and being of substantially the same cross sectional contour as that of the interior of the enclosure and having passageways providing the sole means whereby air may pass through the lower opening and into the shaft, and means for regulating passage of air from said enclosure.

7. In heating apparatus, a member providing an enclosure and an air shaft having an opening in the upper portion thereof, an opening in the lower portion of the member, a heating element, said heating element being arranged transversely of the length in the interior of the enclosure above the lower opening and being of substantially the same cross sectional contour as that of the interior of the enclosure and having passageways providing the sole means whereby air may pass through the lower opening and into the shaft, and thermal responsive means for regulating passage of air from said enclosure.

8. In heating apparatus, an enclosure providing an air shaft having an opening in the upper portion thereof and an opening in the lower portion, a heating element having tubular fluid passages, all of which are located in the same plane, said heating element being located in the enclosure and extending from the upper portion of the lower opening to the rear of the enclosure and having passageways providing the sole means whereby air may pass through the lower opening and into said enclosure.

9. In heating apparatus, an enclosure providing an air shaft having an opening at the upper portion thereof and an opening at the lower portion, a heating element having fluid passages, all of which are arranged in the same plane, said heating element being located in the enclosure and extending from the upper portion of the lower opening to the rear of the enclosure and having passageways providing the sole means whereby air may pass through the lower opening and into said enclosure.

In testimony whereof, I have hereunto signed my name.

ARTHUR B. MODINE.